June 20, 1961 J. W. HEANEY 2,989,695
DUAL BULLET VELOCITY MEASURING SYSTEM
Filed Aug. 27, 1959 2 Sheets-Sheet 1

*INVENTOR.*
JOSEPH W. HEANEY
BY *S. J. Rotondi, A. J. Dupont,*
*& S. Rubroff*
ATTORNEYS:

INVENTOR.
JOSEPH W. HEANEY

2,989,695
DUAL BULLET VELOCITY MEASURING SYSTEM
Joseph W. Heaney, Philadelphia, Pa., assignor to the United States of America as represented by the Secretary of the Army
Filed Aug. 27, 1959, Ser. No. 836,560
6 Claims. (Cl. 324—70)
(Granted under Title 35, U.S. Code (1952), sec. 266)

The invention described herein may be manufactured and used by or for the Government for governmental purposes without the payment to me of any royalty thereon.

This invention relates to devices for determining the velocity of flying objects, and has for its object the provision of a device which is operable to determine the velocity of a plurality of bullets fired from the same round of ammunition.

It has been customary in the past to determine the velocity of a single bullet by an arrangement including a pair of lumiline screens, one of which is located at the muzzle of the gun and the other of which is located at some distance therefrom. In the operation of this arrangement, the passage of the bullet through the second or terminal produces a control pulse which is applied directly to the stop terminal of the chronograph. Since the distance between the screens is known, the velocity of the bullet is readily determined from the chronograph reading.

Where a plurality of bullets are fired from the same round of ammunition, however, the above arrangement is not applicable for the reason that a separate chronograph must be started and stopped in response to the passage of each bullet through the screens. The present invention avoids this difficulty by providing between the screens and the chronograph circuits by which the control pulses resulting from the passage of different bullets through the screens are automatically shifted or directed to the start or stop connections of different chronographs. As hereinafter explained, these signal shifting circuits reset themselves automatically after each operation so that they are ready for another operating cycle.

The invention will be better understood from the following descritpion when considered in connection with the accompanying drawing and its scope is indicated by the appended claims.

Figure 1:
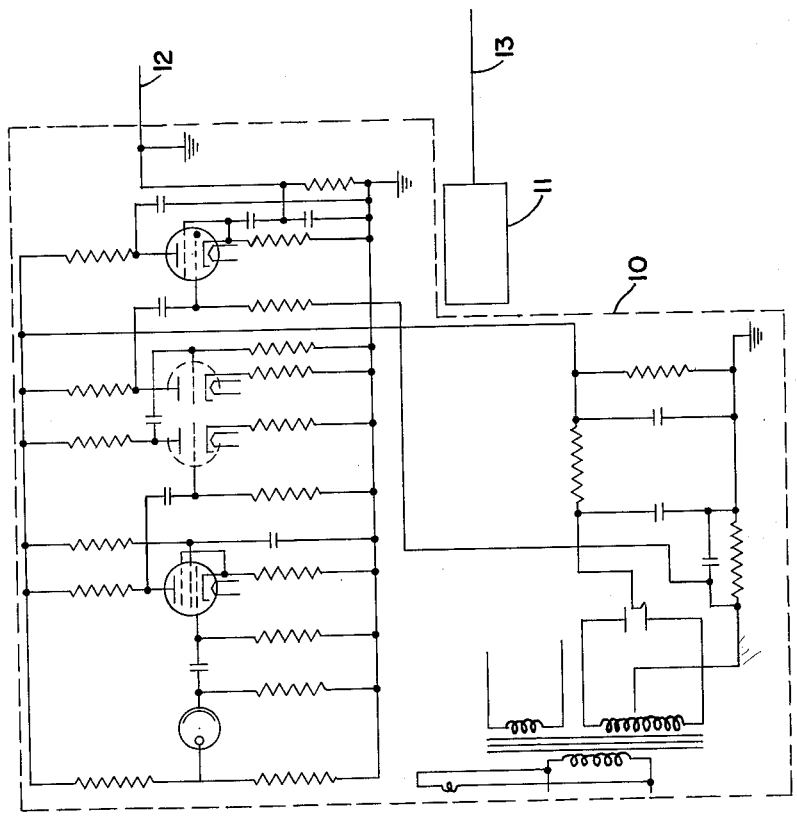
Figure 2:
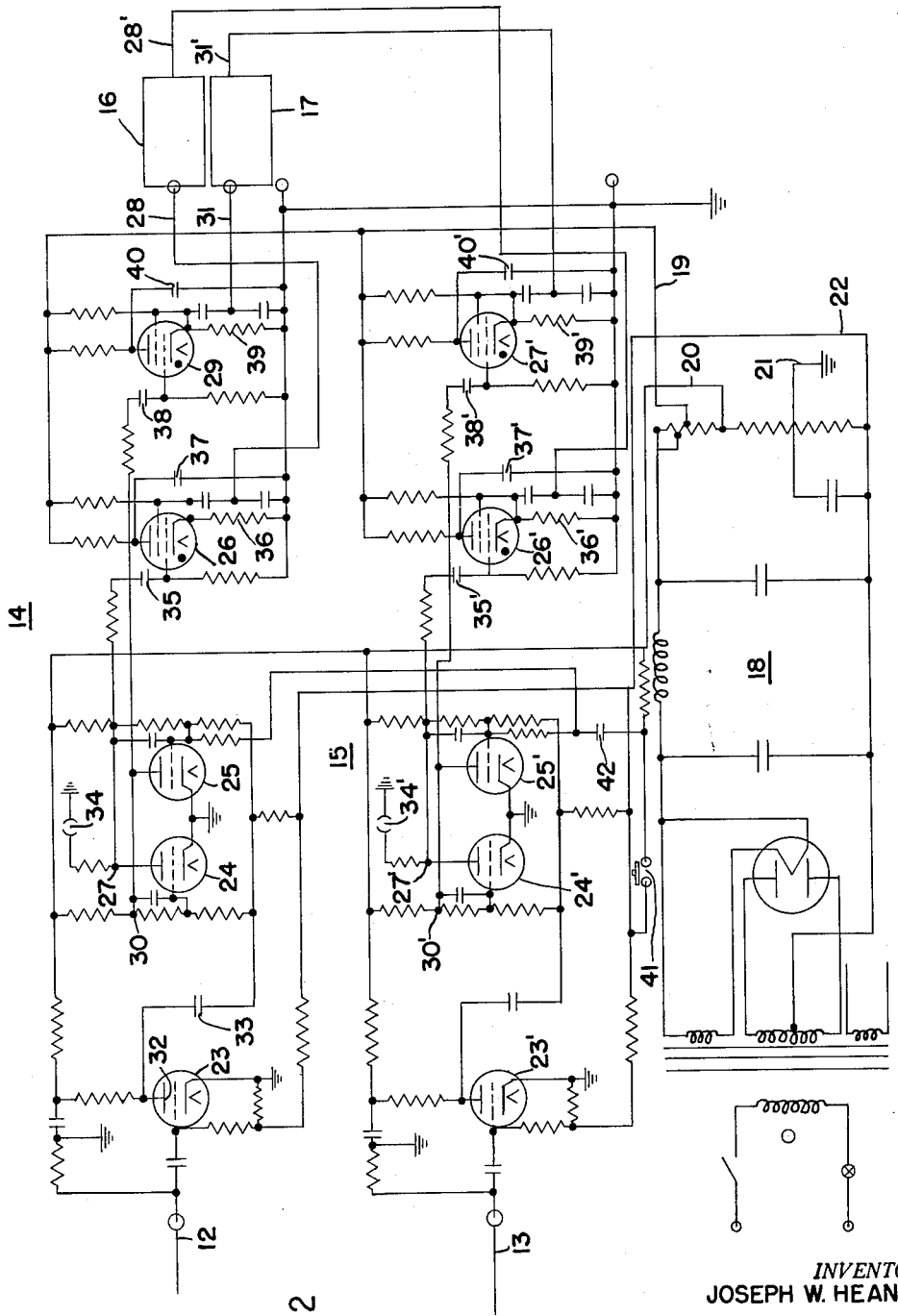

FIGS. 1 and 2 are a wiring diagram of the velocity measuring device, FIG. 1 showing the connections of a pair of lumiline screens and FIG. 2 showing the signal shift circuits to which the outputs of the screens are connected.

FIGURE 1 shows a pair of lumiline screen means 10 and 11, the screen 10 being the muzzle screen and the screen 11 being the terminal screen. The screen means 10 is shown in considerable detail while the screen means 11 is shown as a box. These two screen means are identical, are well known to those skilled in the art and require no detailed description. They each provide at an output lead 12 or 13 a control pulse upon the passage of a bullet through them. The signal at the terminal 12 is applied to a signal shift circuit 14 which is connected to the start connections of a pair of chronographs 16 and 17. The signal at the terminal 13 is applied to a signal shift circuit 15 which is connected to the stop connections of the chronographs 16 and 17.

The present invention pertains to the signal shift circuits 14 and 15, the chronographs 16 and 17 and the screen means 10 and 11 being too well known to those skilled in the art to require further description.

The signal shift circuits 14 and 15 are identical, each including an input amplifier, a multivibrator, and a pair of gas filled tubes which are commonly known as thyratrons. Each of these thyratrons has its output lead connected to a different terminal of the chronograph 16 or the chronograph 17. Since the connections and operations of the circuits 14 and 15 are identical, a description of the channel 14 will sufficiently explain the operation of both channels. Power for operating the circuits 14 and 15 is derived from a power pack 18 which has a +225 volt terminal 19, a +150 volt terminal 20, a ground terminal 21 and a −150 volt terminal 22.

The signal shift channel 14 includes an input amplifier 23, a multivibrator including triodes 24 and 25, a thyratron 26 which has its input coupled to the terminal 27 of the multivibrator and its output connected to the start lead 28 of the chronograph 16. The channel 14 also includes a thyratron 29 which has its input coupled to a terminal 30 of the multivibrator and its output connected to the start terminal 31 of the chronograph 17. Similar parts of the channel 15 are indicated by similar reference numerals with the difference that the reference numerals of the channel 15 are primed.

The input amplifier 23 is designed to be operating at cutoff with a bias of −5 volts D.C. It will function only on the application of a positive potential such as the steep front pulse delivered by the output circuit of the lumiline screen. Output is taken from the plate 32 and is therefore in the form of a negative pulse. This negative pulse is applied through a capacitor 33 to the grids of the tubes 24 and 25 which constitute a part of the multivibrator.

The multivibrator is of a well known type wherein the triodes 24 and 25 are interconnected through a network of resistors and capacitors. It has two stable conditions of operation, one when the triode 24 is conducting and the other when the triode 25 is conducting. It is changed from one operating condition to another in response to the application of a negative pulse to the grids of the triodes 24 and 25. Thus assuming the triode 24 to be conducting as shown by a neon indicator 34, the application of a negative pulse through capacitor 33 functions to transfer current to the triode 25 and produce a positive pulse at the terminal 27. With current in the triode 25, the application of a negative pulse through the capacitor 33 transfers current to the triode 24 producing a positive pulse at the terminal 30.

The positive pulse at the lead 27 is applied through a capacitor 35 to the input of the thyratron 26. This causes the thyratron to conduct current through a resistor 36 and produce at the lead 28 a positive pulse whereby the chronograph 16 is started. Current through the thyratron is automatically interrupted by the discharge of a capacitor 37 which is connected between the plate and cathode of the thyratron.

Similarly the positive pulse at the lead 30 is applied through a capacitor 38 to the input of the thyratron 29, this thyratron conducts current producing a positive pulse at the lead 31, and the current is interrupted by discharge of a capacitor 40.

The overall operation of the device is readily understood in view of the foregoing explanation. The first bullet through the screen 10 produces a pulse which transfers current from the triode 24 to the triode 25 and otherwise functions through the circuit 14 to start the chronograph 16. This chronograph continues to run until this first bullet passes through the screen 11 and functions as indicated above to apply a positive pulse to the stop lead 28' of the chronograph 16. The second bullet through the screens similarly functions through the circuits 14 and 15 to start and stop the chronograph 17.

Incorporated in the device is a reset switch 41 which is operable to apply a negative pulse through a capacitor 42 to the grids of the triodes 25 and 25' for resetting the multivibrators so that current is in the triodes 24 and 24'. This switch is used only in the event the switching circuits become unbalanced due to a bullet being out of the sensitive area of the screen or the like. During normal operation, the device automatically resets itself to its original operating condition.

Types of tubes and values of resistors are indicated on the drawing. Such of these values as may be varied over a range of ±5% are indicated by an asterisk. All capacitor values are in m.m.f. unless otherwise expressed.

I claim:

1. In a device for determining the velocities of two bullets fired from a single round of ammunition, the combination of muzzle and terminal screen means each operable to produce a control pulse upon the passage of a bullet therethrough, a pair of chronographs having start and stop connections, a first circuit operable in response to the passage of the first of said bullets through said muzzle screen to apply a starting pulse to the first of said chronographs and operable in response to the passage of the second of said bullets through said muzzle screen to apply a starting pulse to the second of said chronographs, and a second circuit operable in response to the passage of the first of said bullets through said terminal screen to apply a stopping pulse to the first of said chronographs and operable in response to the passage of the second of said bullets through said terminal screen to apply a stopping pulse to the second of said chronographs.

2. In a device for determining the velocities of two bullets fired from a single round of ammunition, the combination of muzzle and terminal screen means each operable to produce a control pulse upon the passage of a bullet therethrough, a pair of chronographs each having start and stop connections, a first circuit operable in response to the successive passage of said bullets through said muzzle screen to apply starting pulses to said chronographs successively, and a second circuit operable in response to the successive passage of said bullets through said terminal screen to apply stopping pulses to said chronographs successively, said circuits each including a multivibrator operable to different stable conditions in response to said control pulse and each including a pair of thyratrons each operable in response to a different one of said conditions to apply a pulse to a different one of said chronographs.

3. A combination according to claim 2 wherein said thyratrons have means whereby their currents are interrupted automatically at a predetermined time after they are fired.

4. A combination according to claim 3 wherein current interrupting means are capacitors connected in shunt to the plate circuits of said thyratrons.

5. A combination according to claim 2 wherein means are arranged to apply to said multivibrators a pulse whereby they are set to similar stable conditions.

6. In a system for measuring the velocities of leading and following bullets fired simultaneously from the same gun barrel, the combination of means spaced apart along the trajectories of said bullets at points adjacent to and remote from the muzzle of said barrel, each of said spaced apart means being operable to produce a positive pulse when traversed by a bullet, a pair of signal shift channels each including an amplifier with its output circuit connected to a multivibrator having a pair of output circuits wherein positive pulses are produced successively in response to successive negative output pulses of said amplifier, said successive positive pulses being applied to different thyratrons having output circuits wherein transitory control pulses are produced successively, a pair of chronographs each having a start circuit and a stop circuit, means associated with one of said shift channels for connecting it with said adjacent spaced apart means and for applying its transitory control pulses successively to the start circuits of said chronographs, and means associated with the other of said shift channels for connecting it with said remote spaced apart means and for applying its transitory control pulses successively to the stop circuits of said chronographs.

References Cited in the file of this patent

UNITED STATES PATENTS 2,617,023     Weller _____ Nov. 4, 1952

OTHER REFERENCES

"Control and Timing Circuits" by John D. Goodell, Radio News, August 1946, pages 15 to 17, 20 and 23.